(12) United States Patent
Jones

(10) Patent No.: US 8,042,850 B2
(45) Date of Patent: Oct. 25, 2011

(54) FLEXIBLE SKEWER SYSTEM FOR SUPPORTING FOOD DURING COOKING

(75) Inventor: James H. Jones, Winfield, KS (US)

(73) Assignee: Inno-Labs, LP, Winfield, KS (US)

( * ) Notice: Subject to any disclaimer, the term of this patent is extended or adjusted under 35 U.S.C. 154(b) by 0 days.

(21) Appl. No.: 10/798,155

(22) Filed: Mar. 9, 2004

(65) Prior Publication Data
US 2005/0200141 A1    Sep. 15, 2005

(51) Int. Cl.
*A47J 43/18* (2006.01)
*A47J 37/04* (2006.01)

(52) U.S. Cl. .............................. 294/61; 294/1.1; 99/419

(58) Field of Classification Search .................... 294/61, 294/1.1; 43/55; 224/103; D7/683, 684; 99/419; D22/134, 137
See application file for complete search history.

(56) References Cited

U.S. PATENT DOCUMENTS

| | | | | | |
|---|---|---|---|---|---|
| 1,608,953 | A | * | 11/1926 | Pflueger | 224/103 |
| 2,404,166 | A | * | 7/1946 | Danilla | 99/419 |
| 2,536,531 | A | * | 1/1951 | Bishop | 224/103 |
| 2,550,217 | A | * | 4/1951 | Bourque | 224/103 |
| 2,760,700 | A | * | 8/1956 | Lien | 224/103 |
| D180,146 | S | * | 4/1957 | Hagerstrom | D10/60 |
| 2,972,438 | A | * | 2/1961 | Kimbrough | 224/103 |
| 3,371,830 | A | * | 3/1968 | Parkman | 294/149 |
| 3,590,726 | A | * | 7/1971 | Warner | 99/419 |
| 4,258,617 | A | | 3/1981 | Akwei | 99/419 |
| D318,314 | S | * | 7/1991 | Watkins | D22/134 |
| 5,193,443 | A | | 3/1993 | Carney | 99/419 |
| 5,297,534 | A | * | 3/1994 | Louden | 126/30 |
| 5,310,381 | A | | 5/1994 | Green | 452/198 |
| 5,323,692 | A | | 6/1994 | Grzywna et al. | 99/343 |
| 5,374,268 | A | * | 12/1994 | Sander | 606/72 |
| 5,482,195 | A | * | 1/1996 | Hobbs | 43/55 |
| 5,511,293 | A | | 4/1996 | Hubbard, Jr. et al. | |
| 5,881,490 | A | * | 3/1999 | Richardson | 43/44.2 |
| 5,970,697 | A | | 10/1999 | Jacobs et al. | |
| 6,009,796 | A | | 1/2000 | Larzik | 99/421 |
| D430,461 | S | | 9/2000 | Fielding | D7/684 |
| 6,286,418 | B1 | | 9/2001 | Berke et al. | 99/421 |
| 6,772,924 | B2 | * | 8/2004 | Bennett | 224/103 |
| D512,885 | S | * | 12/2005 | Zemel | D7/683 |
| 2002/0189462 | A1 | * | 12/2002 | Guess | 99/326 |

FOREIGN PATENT DOCUMENTS

| | | |
|---|---|---|
| DE | 3914414 | 10/1990 |
| JP | 2003/61805 | 11/2002 |
| JP | 2002/330853 | 3/2003 |

* cited by examiner

*Primary Examiner* — Paul T Chin
(74) *Attorney, Agent, or Firm* — Greenberg Traurig LLP

(57) ABSTRACT

A flexible skewer system for providing versatile cooking upon a grill. The flexible skewer system includes an elongated flexible member, a loop extending from an end of the flexible member and a piercing implement extending from an opposite end of the flexible member. The flexible member is preferably comprised of a stainless steel cable. In use, the user is able to manipulate the shape of the flexible member about other food items on the grill while allowing the loop and piercing implement to be exterior of the grill. Alternatively, a second piercing implement may be utilized instead of a loop.

5 Claims, 9 Drawing Sheets

FLEXIBLE SKEWER SYSTEM FOR SUPPORTING FOOD DURING COOKING

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to skewers and more specifically it relates to a flexible skewer system for providing versatile cooking upon a grill.

2. Description of the Related Art

Skewers have been in use for years for cooking food (e.g. steak, chicken, vegetables) upon a grill or other cooking environment. A conventional skewer is comprised of a rigid, straight rod structure having an end member and a pointed end. A conventional skewer is typically constructed of a rigid metal rod or wood rod.

The user of a conventional skewer first inserts the food items upon the shaft of the conventional skewer and then positions the skewer upon the grill. Since a conventional skewer is a rigid straight structure, the user typically positions the entire skewer upon the grill. If the user attempts to extend the end member of the skewer outside of the grill cover, the grill cover will sometimes not completely close. In addition, since the conventional skewer is a rigid and straight structure, it can be difficult to efficiently utilize the grill surface area when other food items such as chicken legs, steaks, sausage and the like are on the grill. A further problem with conventional skewers is that they can be difficult to utilize within food items with bones such as chicken legs and wings since they can only pass through the meat portion in a straight line.

While these devices may be suitable for the particular purpose to which they address, they are not as suitable for providing versatile cooking upon a grill. Conventional skewers are not suitable for versatile cooking of food items.

In these respects, the flexible skewer system according to the present invention substantially departs from the conventional concepts and designs of the prior art, and in so doing provides an apparatus primarily developed for the purpose of providing versatile cooking upon a grill.

BRIEF SUMMARY OF THE INVENTION

In view of the foregoing disadvantages inherent in the known types of skewers now present in the prior art, the present invention provides a new flexible skewer system construction wherein the same can be utilized for providing versatile cooking upon a grill.

The general purpose of the present invention, which will be described subsequently in greater detail, is to provide a new flexible skewer system that has many of the advantages of the skewers mentioned heretofore and many novel features that result in a new flexible skewer system which is not anticipated, rendered obvious, suggested, or even implied by any of the prior art skewers, either alone or in any combination thereof.

To attain this, the present invention generally comprises an elongated flexible member, a loop extending from an end of the flexible member and a piercing implement extending from an opposite end of the flexible member. The flexible member is preferably comprised of a stainless steel cable. In use, the user is able to manipulate the shape of the flexible member about other food items on the grill while allowing the loop and piercing implement to be exterior of the grill. Alternatively, a second piercing implement may be utilized instead of a loop.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a flexible skewer system that will overcome the shortcomings of the prior art devices.

A second object is to provide a flexible skewer system for providing versatile cooking upon a grill.

Another object is to provide a flexible skewer system that may be utilized with respect to various sizes and types of food items including but not limited chicken legs, chicken wings, brats, steak, vegetable and the like.

An additional object is to provide a flexible skewer system that allows the distal ends to be exposed from the grill and therefore at a relatively moderate temperature for grasping without protective hand wear.

A further object is to provide a flexible skewer system that allows the cover of the grill to be fully closed without interference.

Another object is to provide a flexible skewer system that provides efficient utilization of grill surface area.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
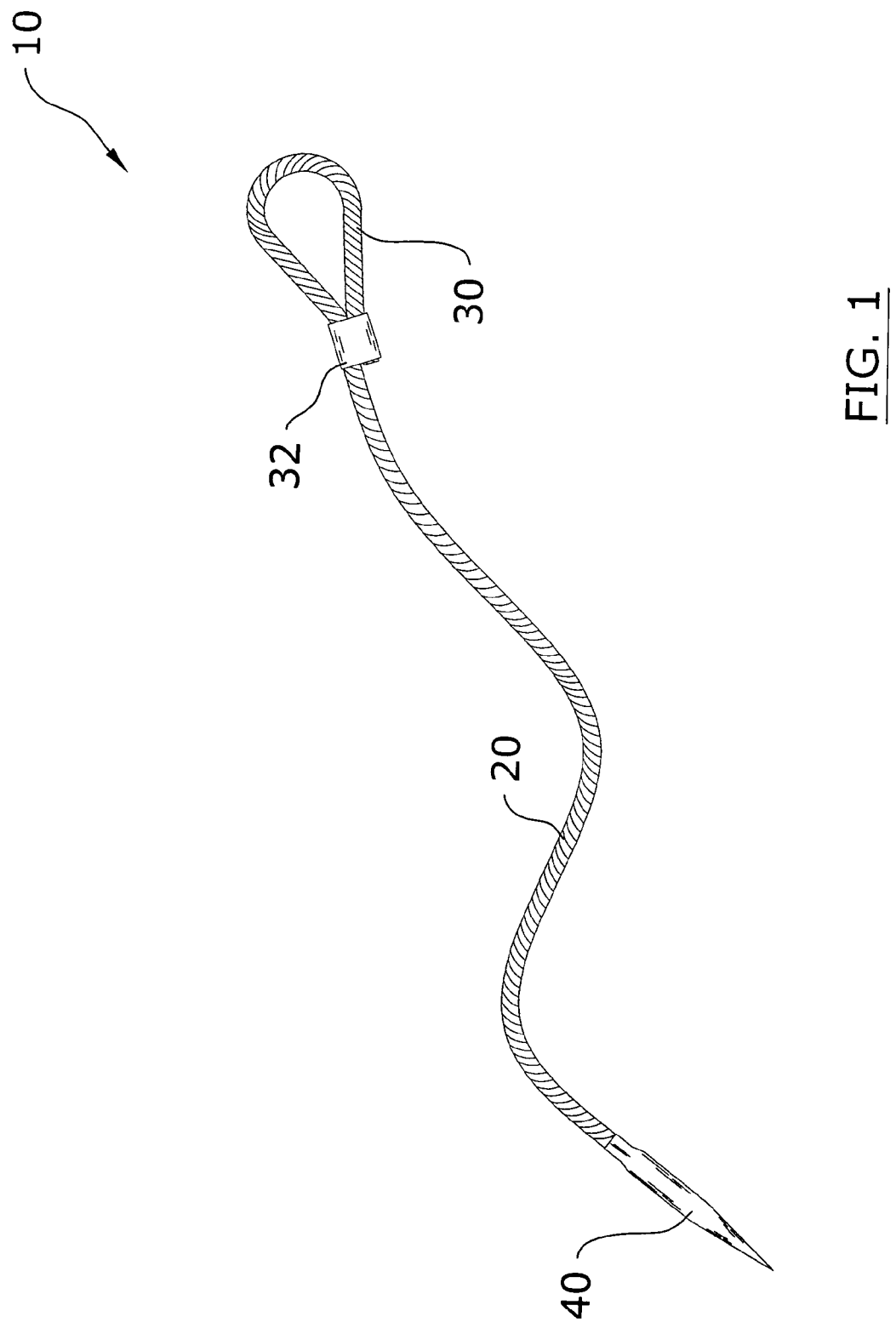
FIG. 1 is a top view of the present invention.

Turning now descriptively to the drawings, in which similar reference characters denote similar elements throughout the several views, FIGS. 1 through 9 illustrate a flexible skewer system 10, which comprises an elongated flexible member 20, a loop extending from an end of the flexible member 20 and a piercing implement 40 extending from an opposite end of the flexible member 20. The flexible member 20 is preferably comprised of a stainless steel cable. In use, the user is able to manipulate the shape of the flexible member 20 about other food items on the grill 12 while allowing the loop and piercing implement 40 to be exterior of the grill 12. Alternatively, a second piercing implement 40 may be utilized instead of a loop.

B. Flexible Member

The elongated flexible member 20 has a first end and a second end as shown in FIG. 1 of the drawings. The flexible member 20 is preferably comprised of a flexible structure as illustrated in the drawings. The flexible member 20 is preferably comprised of a flexible metal cable (e.g. stainless steel cable).

The flexible member 20 preferably has a length greater than approximately twenty inches to accommodate a number of food items and for providing a sufficient length to allow the ends to both extend outside of the grill 12. The flexible member 20 preferably has a diameter of approximately 3/32 inches.

C. End Member

An end member 30 preferably extends from the first end of the flexible member 20 opposite of the piercing implement 40 as shown in FIG. 1 of the drawings. The end member 30 may be comprised of various structures including but not limited to a loop, eyelet, tee-member, ferrule and the like. However, it is preferable that the end member 30 is comprised of a loop or eyelet so that two units of the present invention may be attached to one another. As shown in FIG. 1 of the drawings, a sleeve 32 is preferably secured to the flexible member 20 to secure the first end to the flexible member 20 thereby forming the loop.

D. Piercing Implement

Figure 3:
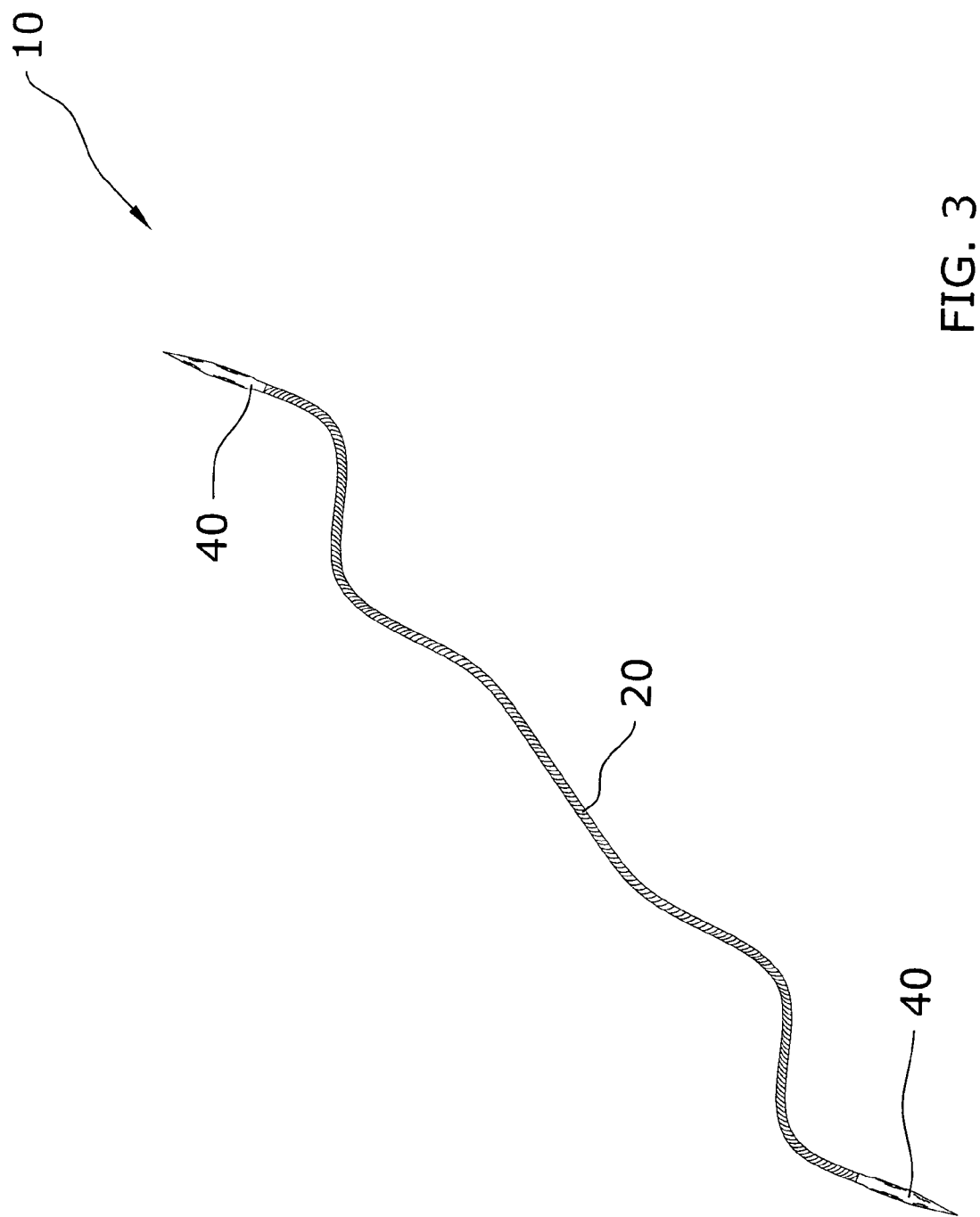
FIG. 3 is a top view of an alternative embodiment utilizing two piercing implements.

The piercing implement 40 extends from the second end of the flexible member 20 opposite of the end member 30 as shown in FIG. 1 of the drawings. The piercing implement 40 preferably has a pointed end for providing easy insertion into food items such as meat and vegetables. As shown in FIG. 3 of the drawings, a second piercing implement 40 may be attached to the first end of the flexible member 20 instead of the end member 30.

E. Operation of Invention

Figure 2:
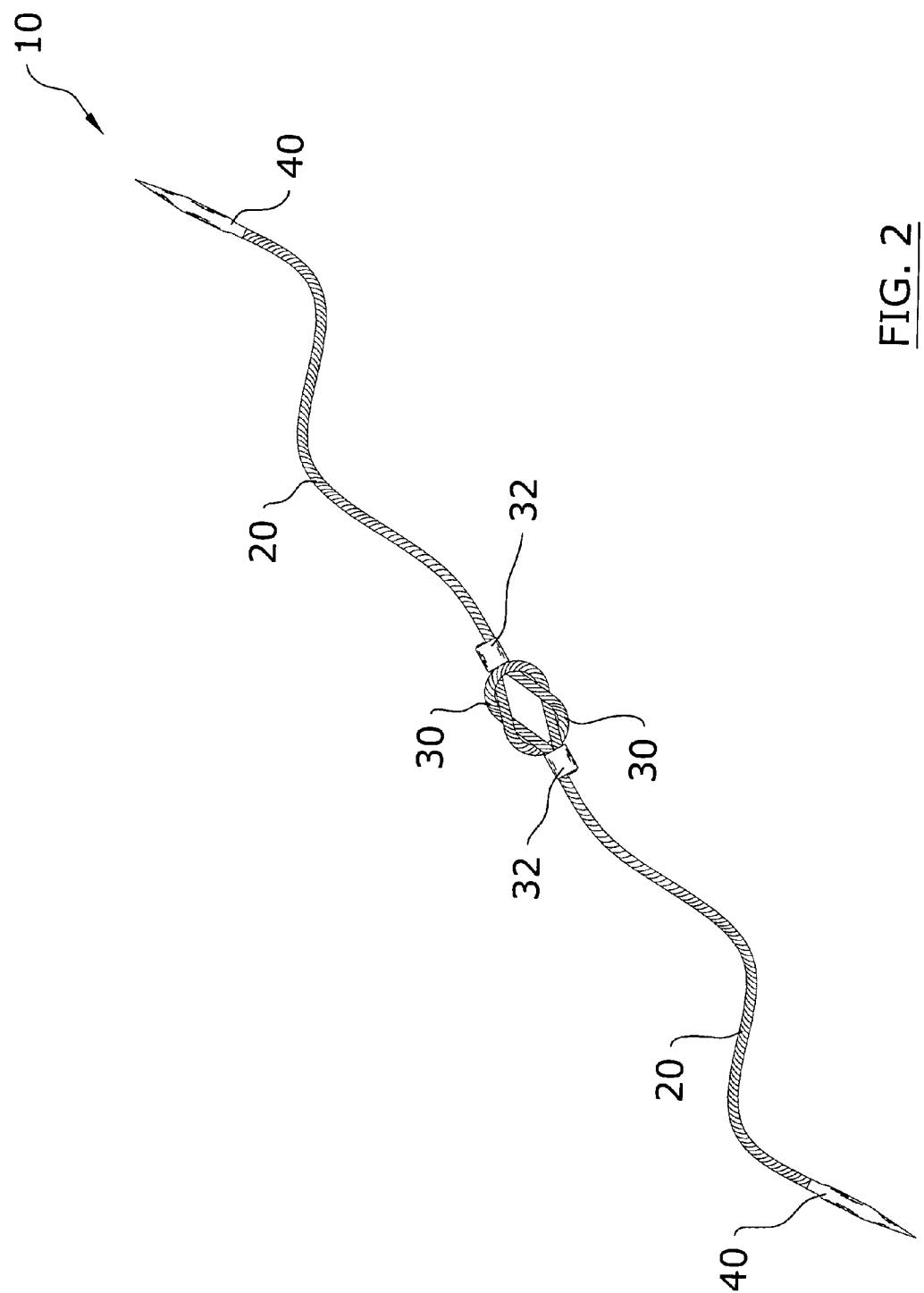
FIG. 2 is a top view of the present invention wherein two units are interconnected to one another.

The user first determines the desired length they will require for the flexible skewer 10 based upon the amount and size of food items. FIG. 2 illustrates attaching two flexible skewers 10 together by inserting the flexible skewers 10 through the loop of the opposing flexible skewer 10.

Figure 4:
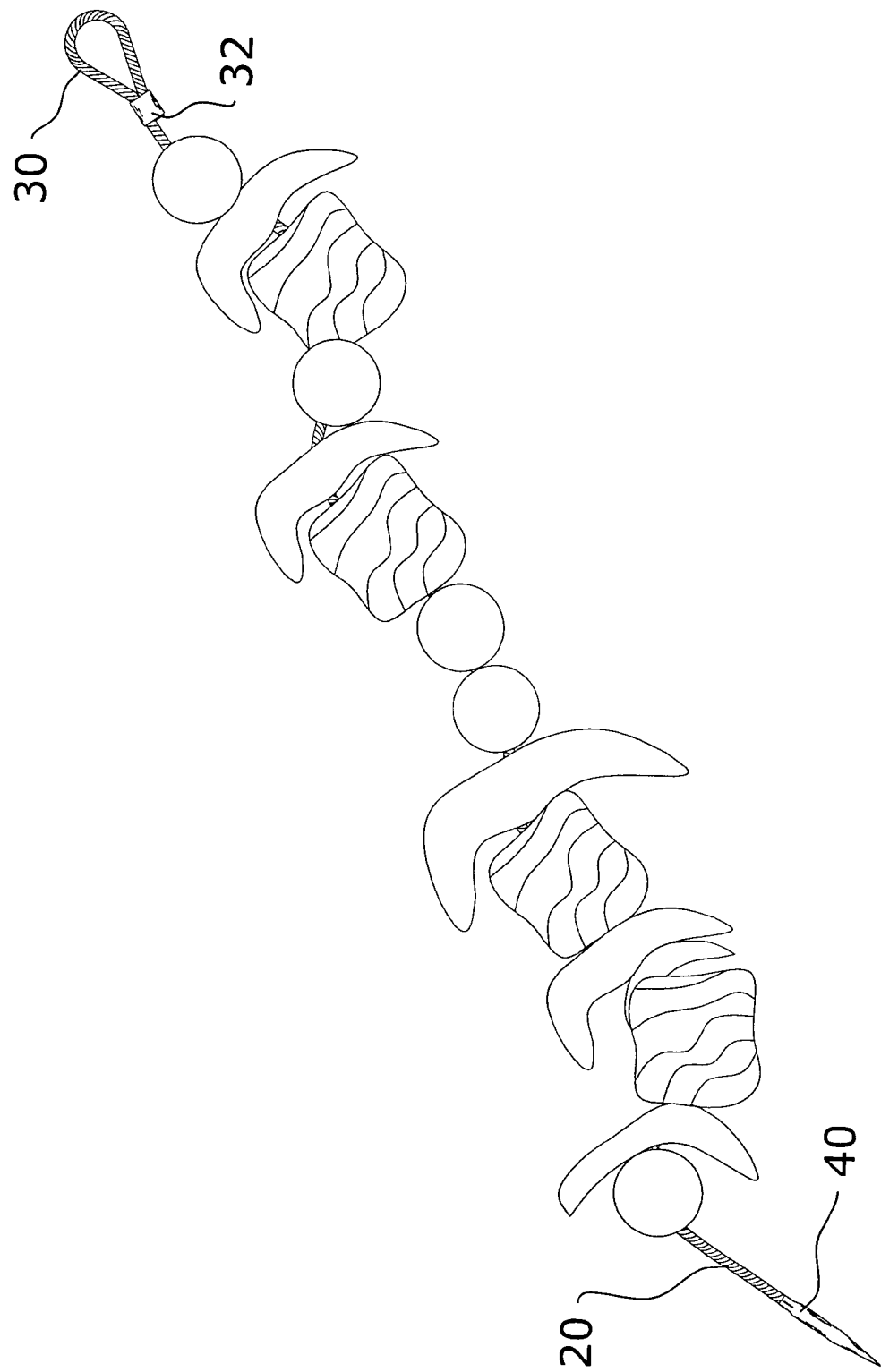
FIG. 4 is a top view of the present invention with food attached upon the flexible member.
Figure 5:
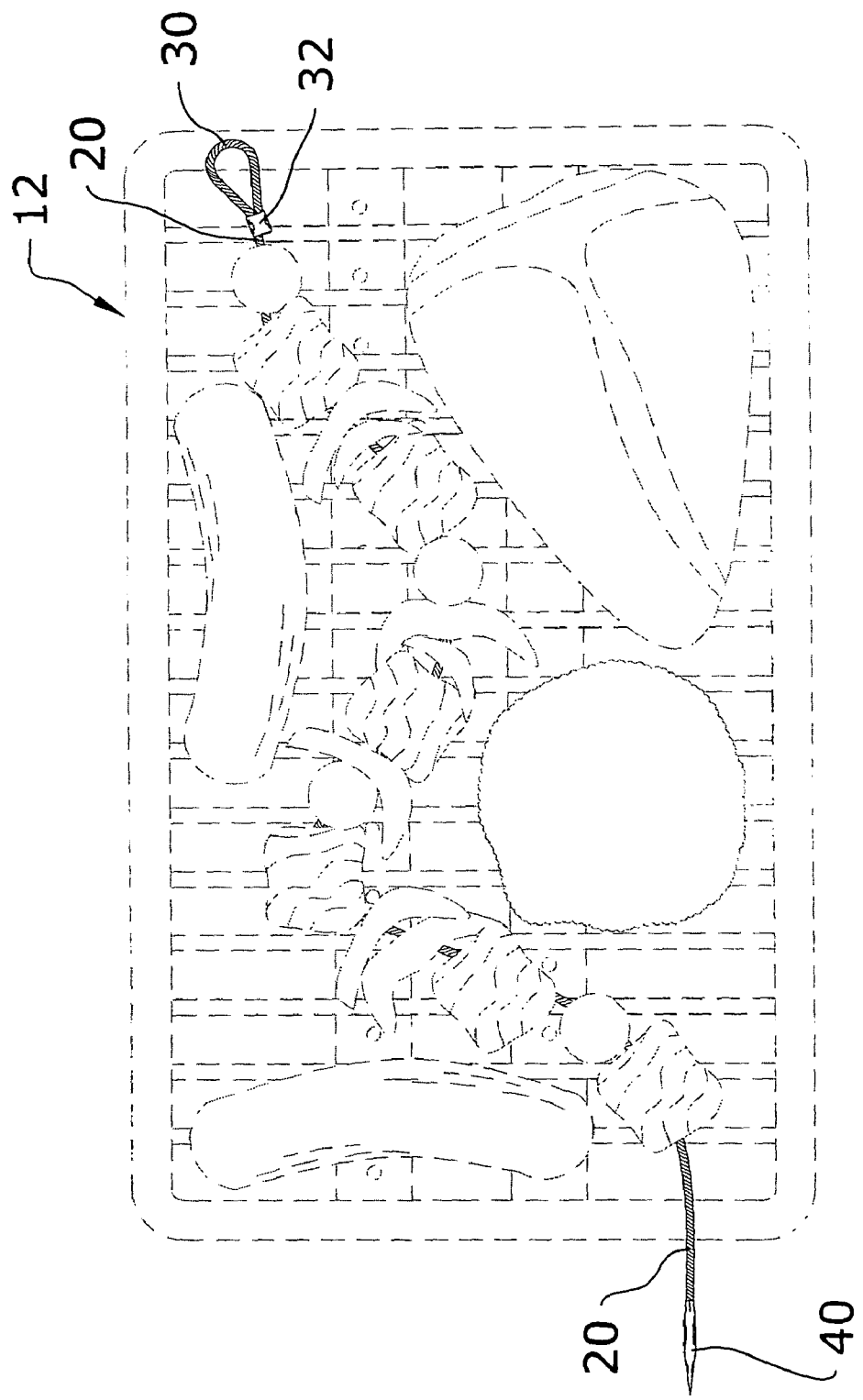
FIG. 5 is a top view of the flexible member with food attached and positioned upon grill.
Figure 6:
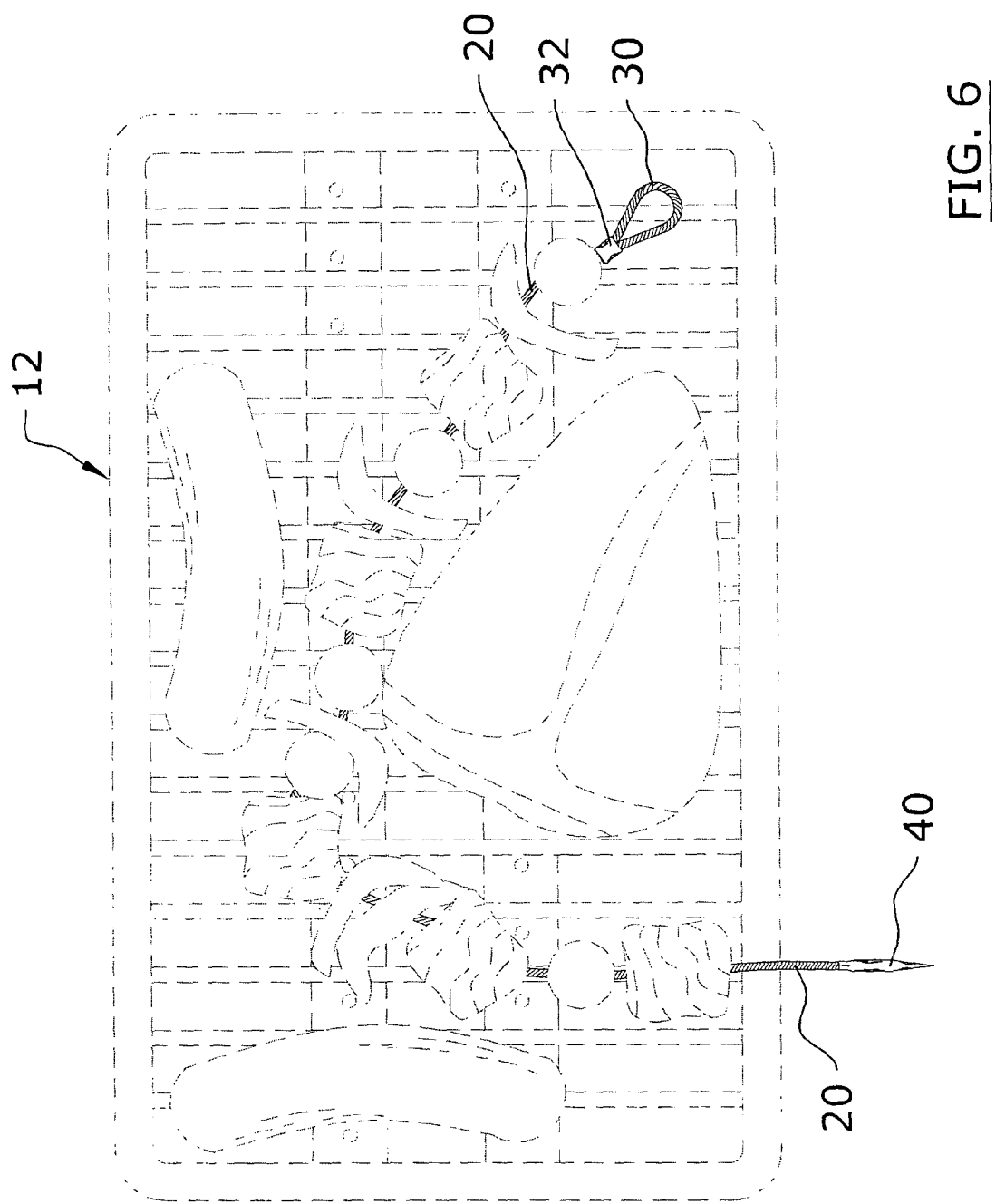
FIG. 6 is a top view of the flexible member with food attached and positioned upon grill with the piercing implement and the loop extending out the front portion of the grill.
Figure 7:
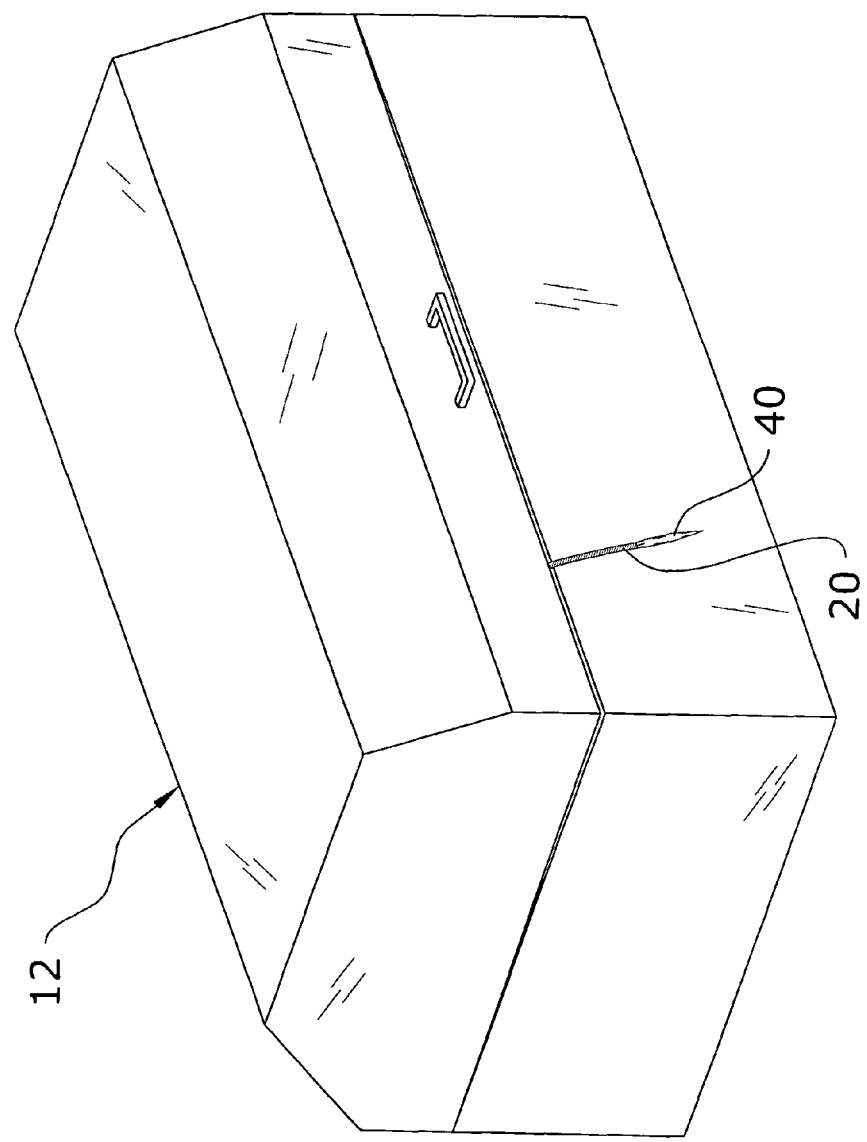
FIG. 7 is an upper perspective view of the distal ends of the present invention extending from a grill.

The user then attaches one or more food items upon the flexible member 20 by inserting the piercing implement 40 through thereof as shown in FIG. 4 of the drawings. The user then positions the flexible skewer 10 upon a cooking surface such as a grill 12 as shown in FIGS. 5 and 6 of the drawings. The user then typically manipulates the flexible skewer 10 about other food items on the cooking surface that are not attached to the flexible skewer 10 as further shown in FIGS. 5 and 6 of the drawings. The user also positions at least one end of the first flexible member 20 external of the cooking surface as shown in FIGS. 5 through 7 of the drawings. The user may then close the cover of the grill 12 with the flexible member 20 bending underneath the cover to allow for full closing of the cover as shown in FIG. 7 of the drawings.

Figure 8:
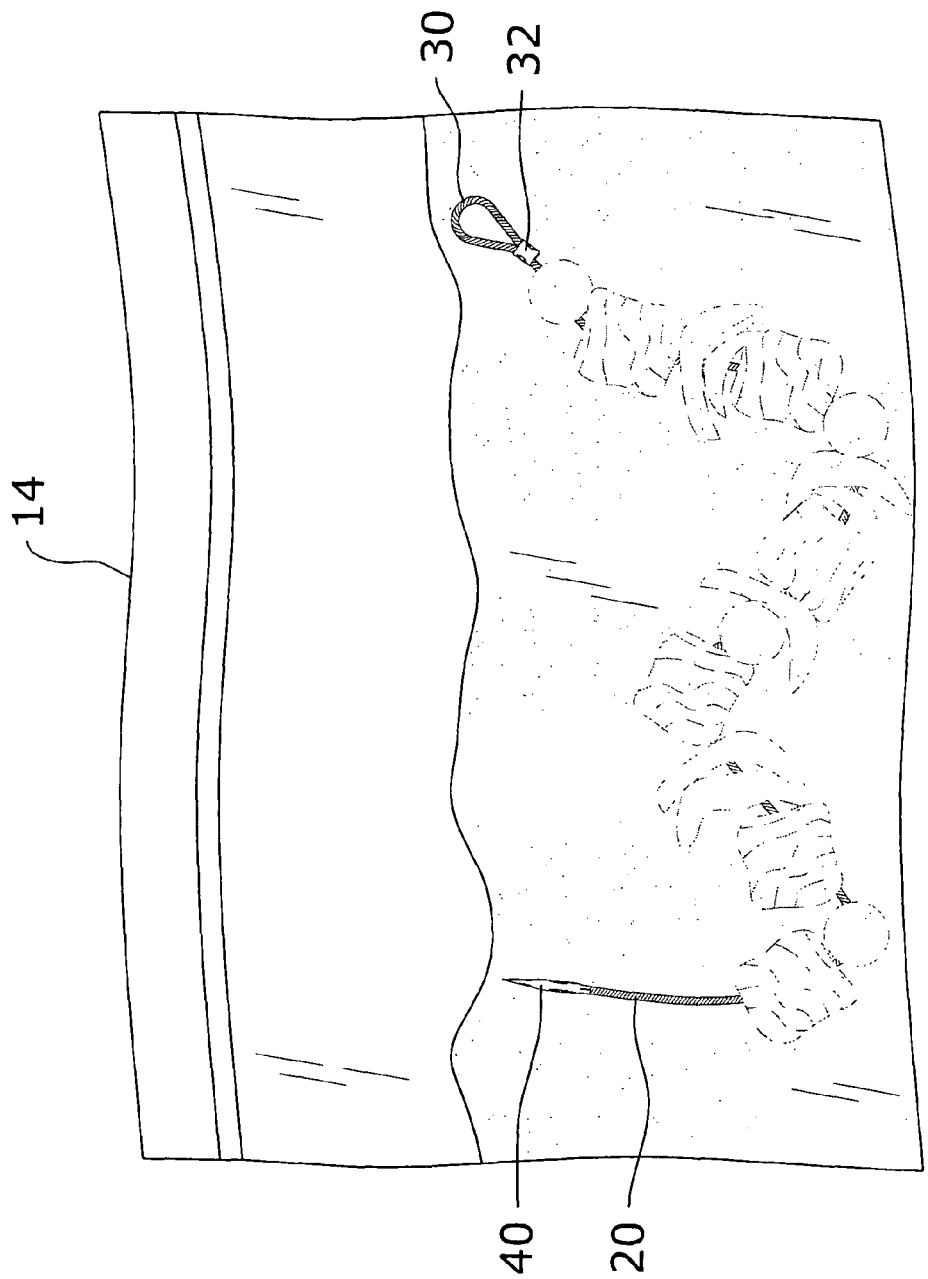
FIG. 8 is a front view of the present invention positioned within a marinade bag.
Figure 9:
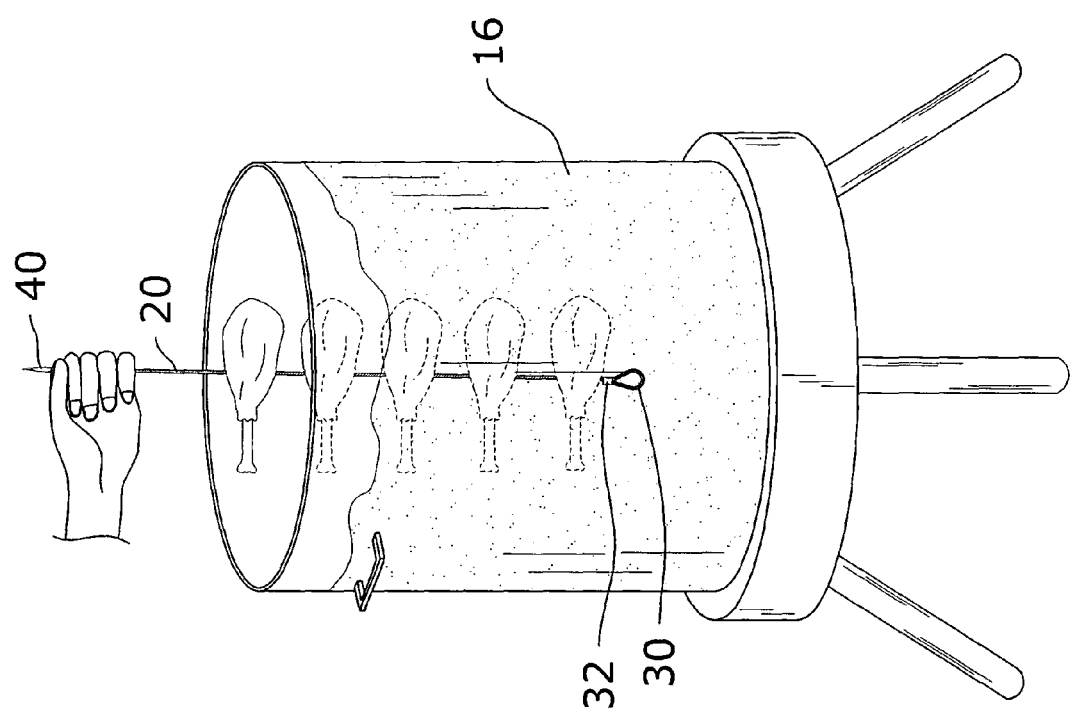
FIG. 9 is front view of the present invention positioned within a deep fryer.

FIGS. 8 and 9 illustrate additional alternative uses of the present invention. FIG. 8 illustrates marinating various food items within a marinade bag 14 before cooking the food items. FIG. 9 illustrates positioning the present invention within a deep fryer 16 for cooking various food items. The present invention may also be utilized in various other commonly utilized cooking environments.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A composite cooking utensil, for retaining, by, sequential implement thereon, one or more food items to be cooked, comprising at feast first and second cooking utensils wherein each utensil comprises:
    an elongated flexible high-temperature resistant member, having first and second ends;
    a piercing member affixed to one of the first and second ends, the piercing element being monolithically formed and having a smooth solid outer surface;
    the other of the first and second ends having a gripping loop formed thereon;
    the composite cooking utensil being formed by simultaneously threading the piercing members of the first and second cooking utensils through the gripping loops of the second and first cooking utensils, until the respective gripping loops are in juxtaposed proximity to one another;
    wherein the piercing member has a first pointed end, and a second attachment end disposed distal to the first pointed end, and wherein the one of the first and second ends of the elongated flexible high-temperature resistant member to which the piercing member is affixed is attached to the second attachment end.

2. The composite cooking utensil according to claim 1, wherein the elongated flexible high-temperature resistant members are metal cables.

3. The composite cooking utensil according to claim 2, wherein the metal cables are fabricated from stainless steel.

4. The cooking utensil according to claim 1, wherein the gripping loops formed on the others of the first and second ends of the elongated flexible high-temperature resistant members further comprise sleeves affixed simultaneously to extreme tips of the other ends, and to portions of the elongated flexible high-temperature resistant members removed from the respective extreme tips of the other ends.

5. A cooking utensil, for retaining, by sequential implement thereon, one or more food items to be cooked, comprising:
- an elongated flexible high-temperature resistant member, having first and second ends;
- a piercing member affixed to one of the first and second ends, the piercing element being monolithically formed and having a smooth solid outer surface;
- the other of the first and second ends having one of the following: a piercing member affixed thereto; a gripping loop formed thereon;
- wherein the piercing member has a first pointed end, and a second attachment end disposed distal to the first pointed end, and wherein the one of the first and second ends of the elongated flexible high-temperature resistant member to which the piercing member is affixed is attached to the second attachment end;
- wherein the elongated flexible high-temperature resistant member is a braided stainless steel cable, operably configured to reduce, the rate of heat conduction along its length; and
- wherein the piercing member is crimped onto the one of the first and second ends of the elongated flexible high-temperature resistant member;
- and wherein a gripping loop is formed on the other of the first and second ends of the elongated flexible high-temperature resistant member, the cooking utensil further comprising a composite cooking utensil formed by simultaneously threading two discrete ones of said cooking utensils through each other's gripping loops, until the respective gripping loops are in juxtaposed proximity to one another.

* * * * *